United States Patent
Kronenthaler et al.

(10) Patent No.: US 11,367,200 B2
(45) Date of Patent: Jun. 21, 2022

(54) METHOD FOR DETERMINING THE IMAGE POSITION OF A MARKER POINT IN AN IMAGE OF AN IMAGE SEQUENCE

(71) Applicant: Scholly Fiberoptic GmbH, Denzlingen (DE)

(72) Inventors: Michael Kronenthaler, Villingen-Schwenningen (DE); Frank Hassenpflug, Villingen-Schwenningen (DE)

(73) Assignee: Scholly Fiberoptic GmbH, Denzlingen (DE)

(*) Notice: Subject to any disclaimer, the term of this patent is extended or adjusted under 35 U.S.C. 154(b) by 72 days.

(21) Appl. No.: 16/903,595

(22) Filed: Jun. 17, 2020

(65) Prior Publication Data

US 2020/0394805 A1 Dec. 17, 2020

(30) Foreign Application Priority Data

Jun. 17, 2019 (DE) .......................... 102019116381.1

(51) Int. Cl.
*G06T 7/20* (2017.01)
*G06T 7/246* (2017.01)
*G06T 7/60* (2017.01)

(52) U.S. Cl.
CPC ................ *G06T 7/246* (2017.01); *G06T 7/60* (2013.01); *G06T 2207/10016* (2013.01); *G06T 2207/30204* (2013.01)

(58) Field of Classification Search
CPC . G06T 7/246; G06T 7/60; G06T 2207/30204; G06T 2207/10016; G06T 3/0068; G06T 7/337; G06T 7/0012; G06T 2207/10068; G06T 2207/30096
See application file for complete search history.

(56) References Cited

U.S. PATENT DOCUMENTS

| | | | |
|---|---|---|---|
| 7,421,101 B2 | 9/2008 | Georgescu et al. | |
| 7,489,809 B2 | 2/2009 | Rush | |
| 2016/0066781 A1* | 3/2016 | Thompson | A61B 3/145 600/476 |
| 2017/0221217 A1* | 8/2017 | Hong | G06T 7/248 |
| 2018/0158199 A1* | 6/2018 | Wang | G06K 9/6202 |
| 2018/0317865 A1* | 11/2018 | Sakaguchi | A61B 6/5205 |

FOREIGN PATENT DOCUMENTS

| | | |
|---|---|---|
| DE | 10246355 | 4/2004 |
| DE | 112004001861 | 1/2013 |
| DE | 102009017135 | 11/2020 |

\* cited by examiner

*Primary Examiner* — Qian Yang
(74) *Attorney, Agent, or Firm* — Volpe Koenig

(57) ABSTRACT

A method for determining the image position of a marker point (3) in an image of an image sequence including the method steps of: setting (S2) a marker point in a first image (1) of the image sequence, determining (S4) a transformation at least between corresponding portions of the first image (1) and a second image (4) of the image sequence, transforming (S5) at least the portion of the first image (1) or the portion of the second image (4) on the basis of the transformation determined, localizing (S6) the marker point (3) in the transformed portion of the image (4'), and mapping (S7) the localized marker point into the second image (4) on the basis of the determined transformation.

17 Claims, 4 Drawing Sheets

METHOD FOR DETERMINING THE IMAGE POSITION OF A MARKER POINT IN AN IMAGE OF AN IMAGE SEQUENCE

INCORPORATION BY REFERENCE

The following documents are incorporated herein by reference as if fully set forth: German Patent Application No. 10 2019 116 381.1, filed Jun. 17, 2020.

TECHNICAL FIELD

A method for determining the image position of a marker point in images of an image sequence.

BACKGROUND

At least one point is marked in a first image in the known methods. Such a marked point is also referred to as a marker point below. Subsequently, image constituents corresponding to the point are determined in the first image of the image sequence and in a further image of the image sequence. This can be implemented by way of known object detection, or edge detection or similar image processing.

However, such methods are disadvantageous in that it is difficult to identify the pixel or the image constituents in the second image if the recording has been rotated, for example, or has otherwise undergone drastic changes.

By way of example, this may occur in endoscopy if fast, jerky movements are carried out or if there is a significant change in the illumination.

A transformation which converts the image constituents of the first image into the image constituents of the second image is determined in a further method. Transforming the marked pixel into the second image with the aid of this transformation is conventional. However, the low accuracy when identifying the marker points, particularly in the case of non-planar objects, is disadvantageous in this case.

SUMMARY

It is therefore an object of the invention to create a method of the aforementioned type, which allows reliable identification of previously defined marker points.

This object is achieved by a method having one or more features of the invention.

The method according to the invention comprises the following method steps:
setting a marker point in a first image of the image sequence,
determining a transformation at least between corresponding portions of the first image and a second image of the image sequence,
transforming at least the portion of the first image or the portion of the second image on the basis of the transformation determined,
localizing the marker point in the transformed portion of the image, and
mapping the localized marker point into the second image on the basis of the determined transformation.

In particular, it is advantageous that the marked points are not, or not necessarily, used to determine the transformation.

This is because this also allows pixels that, e.g., have few characteristic properties in comparison with the remaining constituents of the scene to be easily identified in the second image. Namely, it was found that the identification of the corresponding pixel for such image marks is difficult if, for example, the image is rotated or has otherwise undergone drastic changes.

A further advantage consists of the marker point also being reliably identifiable in non-successive images. This is advantageous, in particular in the case of fast or jerky movements.

Furthermore, the identity of the marker points is maintained, and so even marker points located in similar surroundings and/or located close together are not mixed up.

If need be, relative position information from a position sensor or similar auxiliary signals can also be taken into account when determining the transformation.

In principle, the method can be carried out in a portion of an image, as a result of which the speed of the method can be increased. In the simplest case, the portion comprises the whole image.

In one embodiment, the method is further characterized by the pictorial representation of the mapped marker point in the second image. By way of example, this representation can be implemented by framing, coloring or any other type of highlighting.

In one embodiment, the method is further characterized by the output of the image position, in particular coordinates, of the mapped marker point.

In one embodiment, a marker point is set manually. In particular, a user can enter the marker points on a screen by way of touching.

It is particularly advantageous if a marker point is set in a still of the image sequence. In this way, a point of interest can be selected and marked calmly and with great accuracy.

In one embodiment, a geometric transformation with a plurality of degrees of freedom is used to determine a transformation. Such a matrix transformation allows the fast and simple calculation of a transformation between the first image and a second image. In particular, this also holds true in the case of a pronounced change in the camera position.

The use of a matrix transformation with eight degrees of freedom is particularly advantageous. This renders it possible to take account of, and recognize, scaling, rotation, translation, and perspective changes such as shearing, for example. Additional advantages include a more accurate reconstruction of the reference image and hence a more accurate localization of the marker point in the transformed image.

Moreover, this allows the compensation of effects arising from a rolling shutter of the image sensor during the image recording, for example.

The marker point is localized in the transformed image according to one of the numerous known methods. By way of example, such a method can be an algorithm for object identification and/or feature detection, for example for edge detection and/or corner detection.

The first image is transformed in one embodiment; however, the feature description for the marked pixel is calculated anew for each individual subsequent image in this case and this is complicated from a computational point of view.

Therefore, it is particularly advantageous if the transformation is performed in the second image.

An advantageous embodiment includes checking whether the image position of the marker point is located within the second image prior to the localization. By way of example, this can stop the complicated localization should there be no prospect of success.

For checking purposes, the image position of the marker point is transferred into the transformed second image and mapped into the original second image with the aid of the transformation. This is possible with relatively little computational outlay, and so it is possible to estimate whether a complicated calculation is necessary.

An advantageous embodiment comprises a check as to whether a transformation has been found prior to the localization. If not, this could mean that the image now contains a different scene, for example. For instance, this could have happened due to a significant camera movement.

In one embodiment of the invention, there is an output of an error message or any other warning to a user were the marker point to lie outside of the image.

One embodiment comprises checking, in particular during the localization, as to whether the similarity with which a corresponding marker point is found is sufficient. Should a pixel be concealed in the subsequent image, this prevents any another point in the image, which is the next best corresponding pixel, from being selected.

By way of example, the similarity can be determined by way of descriptors. To this end, it is possible, in particular, to define a threshold for the similarity.

However, the first image does not migrate along in one embodiment. This means that the first image remains constant, at least for a certain number of subsequent images, so that the second image and each subsequent image is compared to this first image. Thus, the transformation is determined between the first image and a second image, and then between the first image and a third image, etc. This facilitates a more accurate localization of the marker in the subsequent image.

In an alternative embodiment of the invention, every successful identification of a marker point in a second point is followed by using said second image as a reference, i.e., first image, for the subsequent third image of the image sequence. This means that the transformation is always determined from one image to the subsequent image.

In addition to individual points as a marker, a plurality of marker points, more particularly geometrically related marker points, can also be used in one embodiment. By way of example, these could show a certain geometric extent of the object under examination, for example a tumor.

In addition to the method, an apparatus for image processing having at least one means for carrying out the method according to the invention is also a constituent part of the invention.

BRIEF DESCRIPTION OF THE DRAWINGS

The invention is explained in more detail below on the basis of an advantageous exemplary embodiment with reference to the appended drawings.

In the figures.

DETAILED DESCRIPTION

Figure 1:
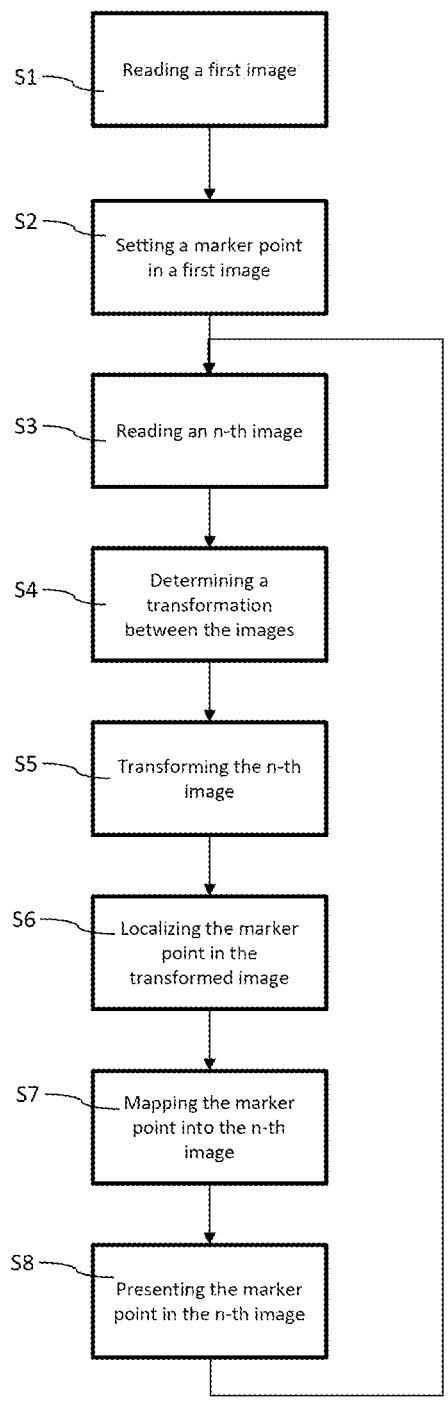
FIG. 1: shows a flowchart of a method according to the invention.

FIG. 1 shows a flowchart of a method according to the invention. By way of example, the method can be carried out in a video controller of an endoscope or in any other image processing unit, in particular an FPGA.

Figure 3:
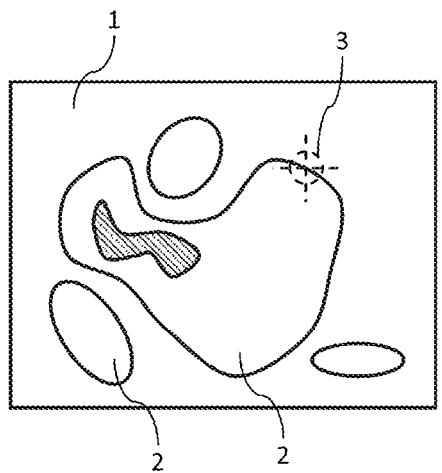
FIG. 3: shows a first image with a marker point.

A first image is read in a first step S1. By way of example, a first image 1 is shown in FIG. 3. By way of example, the first image 1 shows various tissue structures 2. In a marking step S2, a marker point 3, which should currently be tracked, is set in the first image 1. Naturally, a plurality of marker points could also be set. For reasons of simplicity, only one marker point is shown below in each case.

Figure 4:
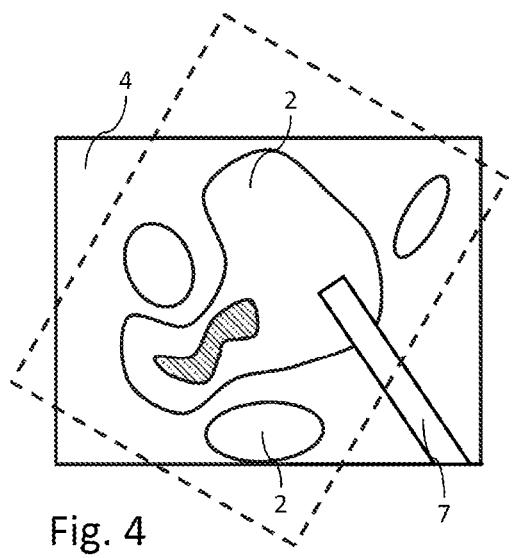
FIG. 4: shows a second image.

Now, an n-th image is read in a step S3. FIG. 4 shows such an n-th image 4. This n-th image 4 is rotated in relation to the first image 1. Here, the relative position of the first image 1 is illustrated using dashed lines.

Now, a transformation that maps the rotated image 4 onto the first image 1 is determined in a further step S4. By way of example, a matrix transformation with a plurality of unknowns, in particular eight unknowns, can be used to find a suitable transformation. By solving the transformation equations, it is thus possible to take account of, e.g., rotation, translation, scaling, and perspective changes.

Figure 5:
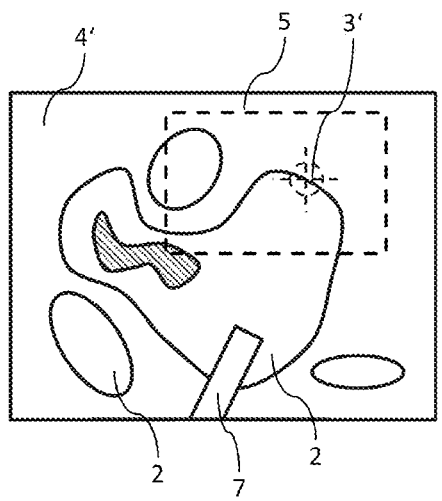
FIG. 5: shows the transformed second image with a localized marker point.

After the transformation has been determined, the n-th image 4 is transformed with the aid of this transformation in a next step S5. The result of the transformation is shown in exemplary fashion in FIG. 5. The transformed image 4' now corresponds to the first image 1 in terms of alignment and scaling.

Now, the marker point 3' is localized in the transformed image 4' in a localization step S6. This localization can be implemented with the aid of known search algorithms, for example for object identification.

Here, the search can be limited to a restricted search region 5, which is defined around the position of the marker point 3 in the first image 1.

Now, the found marker point 3' is transformed into the n-th image 4 in a mapping step S7.

Figure 6:
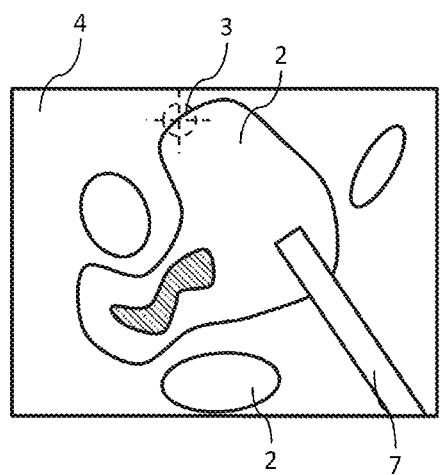
FIG. 6: shows the second image with a mapped marker point.

Finally, the marker point 3 can be presented in the n-th image 4 in a presentation step S8, or the coordinates, for example, could be output. As a result, the marker point 3 in the n-th image 4 is located exactly at the point originally defined in the first image 1, as shown in FIG. 6.

Then, the procedure is repeated with the n+1-th image. As a rule, the images are taken from a video sequence. In particular, the processing of the image signals is preferably implemented so quickly that the marker can be tracked in the live video signal.

It is particularly expedient for the first image to be kept for the running image sequence such that all further images of the image sequence are respectively related to said first image.

Alternatively, the first image could also, in principle, be reset after a certain amount of time and/or after a certain number of elapsed images or be set to the last second image of the interval or to the last image with the visible marker point.

Figure 2:
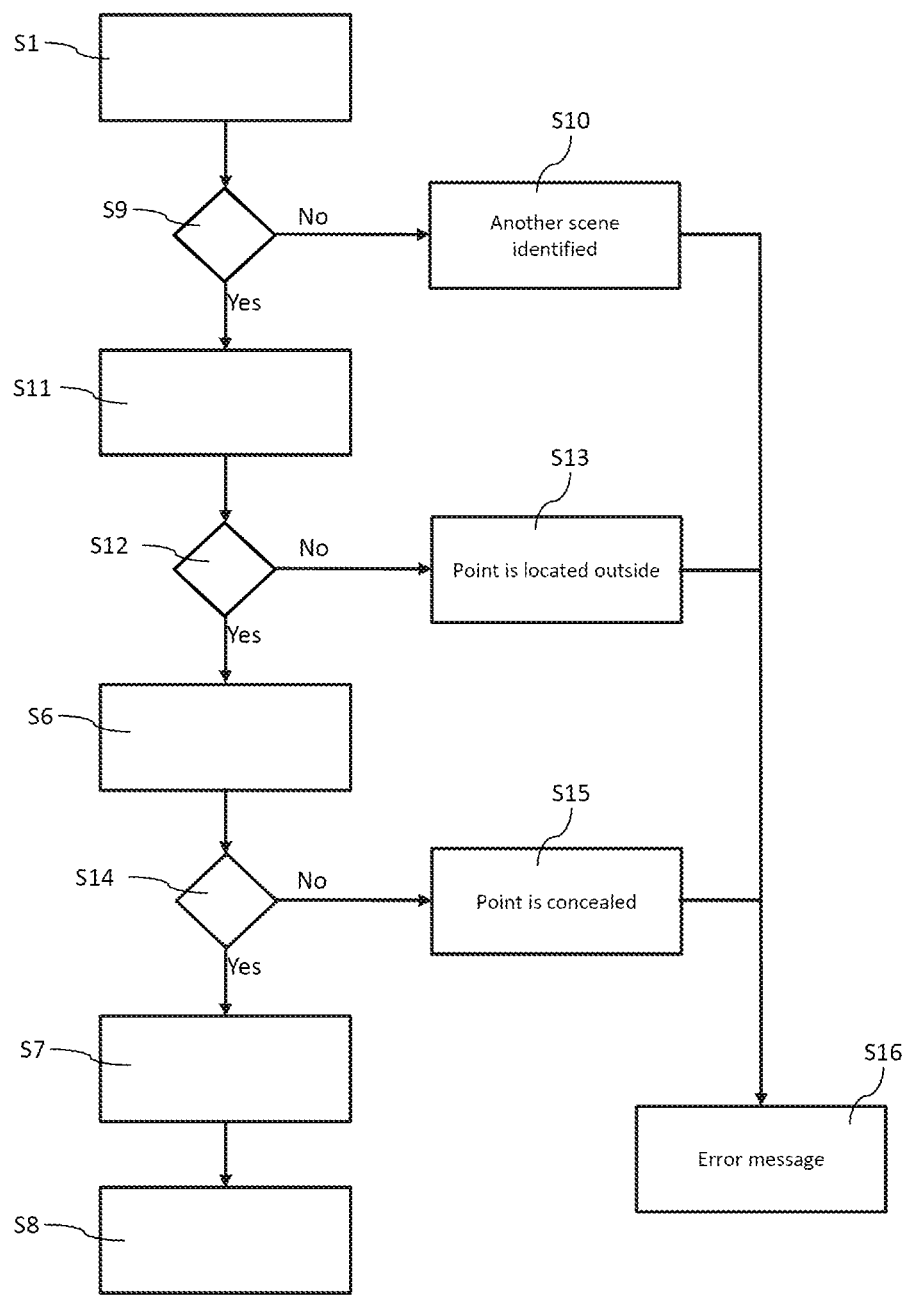
FIG. 2: shows a flowchart of a method according to the invention with error detection.

Various error situations which make it impossible to track the marker point may arise when applying the method, for example in endoscopy. FIG. 2 shows a flowchart of a method according to the invention with corresponding error detection and error handling. The method is based on the method in FIG. 1, with some of the steps not being shown here for reasons of simplicity.

Here, too, a first image 1 is initially loaded in step S1. A check is carried out in a transformation monitoring step S9 as to whether a transformation that maps an n-th image 4 into the first image 1 has been found.

Figure 7:
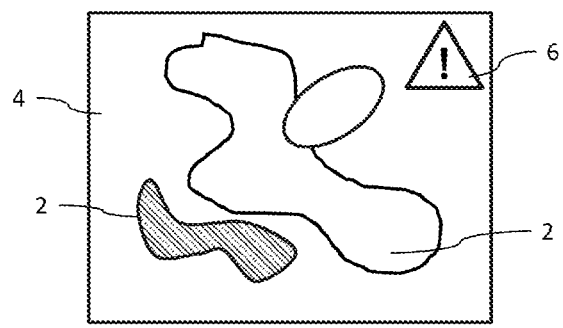
FIG. 7: shows a second image showing a different scene.

If not, an error in the scene of the camera is identified in a scene error step S10. This is the case, in particular, if there was a significant change in the camera position. By way of example, such a situation is illustrated in FIG. 7. Here, the image shows different tissue structures, which is why a transformation is not possible. A corresponding error message is presented in a message step S16. This may also comprise the superimposition of an error symbol 6, as shown in exemplary fashion in FIG. 7. Moreover, an error message can be displayed in plain text.

If so, the marker points 3 marked in the first image 1 are transferred into the transformed n-th image 4' and mapped into the n-th image 4 with the aid of the transformation in a transfer step S11.

In a plausibility step S12, a check is carried out as to whether the marker points 3 transferred thus are located within a valid image region, in particular within the n-th image 4.

Figure 8:
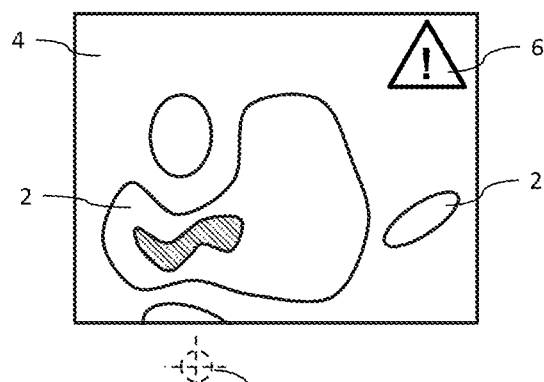
FIG. 8: shows a second image, in which the marker point is located outside of the visual range.

If not, it is identified that at least one marker point 3 is located outside of the image region of the n-th image 4 in an edge error step S13. The message step S16 also follows in this case. FIG. 8 shows such a situation, in which the marker point 3 is located outside of the visible image region.

If so, the localization step S6 follows here. Now, a check is carried out in a similarity test step S14 as to whether the similarity to the first image 1 is sufficiently large for the ascertained point. A threshold for similarity could be defined in this case.

Figure 9:
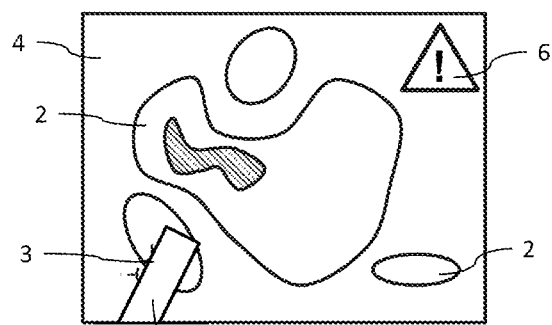
FIG. 9: shows a second image, in which the marker point is concealed.

If not, it is identified that although the marker point is located in the valid image region it is nevertheless not visible, in particular because it is concealed, in a point error step S15. FIG. 9 shows such a situation, in which the marker point 3 is concealed by a medical device 7, for example. The message step S16 follows.

If so, this is followed by the mapping step S7 and the presentation step S8.

LIST OF REFERENCE SIGNS

1 First image
2 Tissue structures
3 Marker point
3' Transformed marker point
4 n-th image
4' Transformed n-th image
5 Search region
6 Error symbol
7 Medical device
S1-S16 Method steps

The invention claimed is:

1. A method for determining an image position of a marker point in an image of an image sequence, comprising the following steps:

setting a marker point in a first image of the image sequence,
determining a transformation at least between corresponding portions of the first image and a second image of the image sequence,
transforming at least a portion of the first image or a portion of the second image based on a determined transformation to form a transformed portion of the image,
localizing the marker point in the transformed portion of the image, and
mapping the localized marker point into the second image based on the determined transformation.

2. The method as claimed in claim 1, further comprising at least one of pictorially representing of the mapped marker point in the second image or outputting of the image position of the mapped marker point.

3. The method as claimed in claim 1, wherein the outputting of the image position of the mapped marker point comprises outputting coordinates.

4. The method as claimed in claim 1, wherein the marker point is set manually.

5. The method as claimed in claim 1, wherein the marker point is set in a still of the image sequence.

6. The method as claimed in claim 1, further comprising using a geometric transformation with a plurality of degrees of freedom for determining the determined transformation.

7. The method as claimed in claim 6, wherein the geometric transformation has eight degrees of freedom.

8. The method as claimed in claim 1, further comprising using an algorithm for at least one of object tracking or feature detection for localizing the marker point.

9. The method as claimed in claim 1, wherein the transformation is performed on the second image.

10. The method as claimed in claim 1, further comprising, prior to the localization, carrying out a check as to whether the image position of the marker point is located within the second image.

11. The method of claim 10, wherein the image position of the marker point is initially transferred into the transformed second image and mapped into the original second image using the transformation.

12. The method of claim 10, wherein prior to the localization, further comprising carrying out a check is as to whether the transformation has been found.

13. The method as claimed in claim 1, further comprising checking whether the similarity with which a corresponding pixel is found is sufficient.

14. The method of claim 13, wherein the checking is carried out during localization, and a threshold for the similarity is defined.

15. The method as claimed in claim 1, wherein the first image does not migrate along but remains constant for a certain number of successive images such that each of the second images is compared with the first image.

16. The method as claimed in claim 1, wherein a plurality of geometrically related marker points are used.

17. An apparatus for image processing, comprising a processor configured for carrying out the method as claimed in claim 1.

* * * * *

UNITED STATES PATENT AND TRADEMARK OFFICE
CERTIFICATE OF CORRECTION

| | |
|---|---|
| PATENT NO. | : 11,367,200 B2 |
| APPLICATION NO. | : 16/903595 |
| DATED | : June 21, 2022 |
| INVENTOR(S) | : Michel Kronenthaler and Frank Hassenpflug |

It is certified that error appears in the above-identified patent and that said Letters Patent is hereby corrected as shown below:

On the Title Page

At item (72) Inventors, Line 1, before the name "Kronehthaler," delete "Michael" and insert therefor -- Michel --.

Signed and Sealed this
Fourth Day of October, 2022

Katherine Kelly Vidal
*Director of the United States Patent and Trademark Office*